W. F. West,
Corn Planter.
No. 110,706.    Patented Jan. 3, 1871.
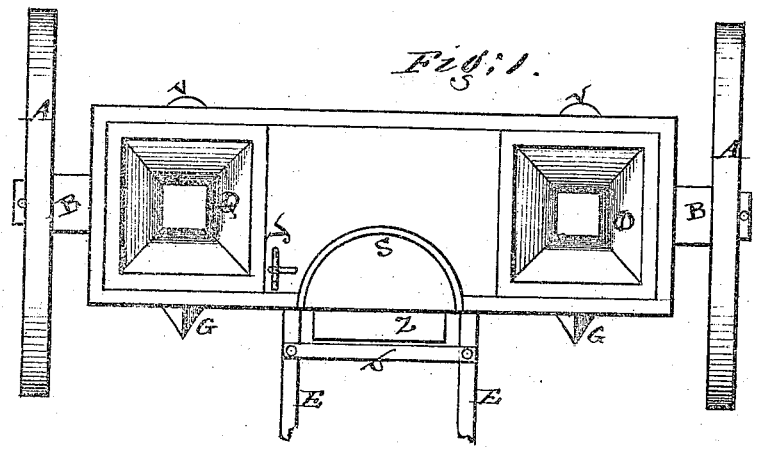
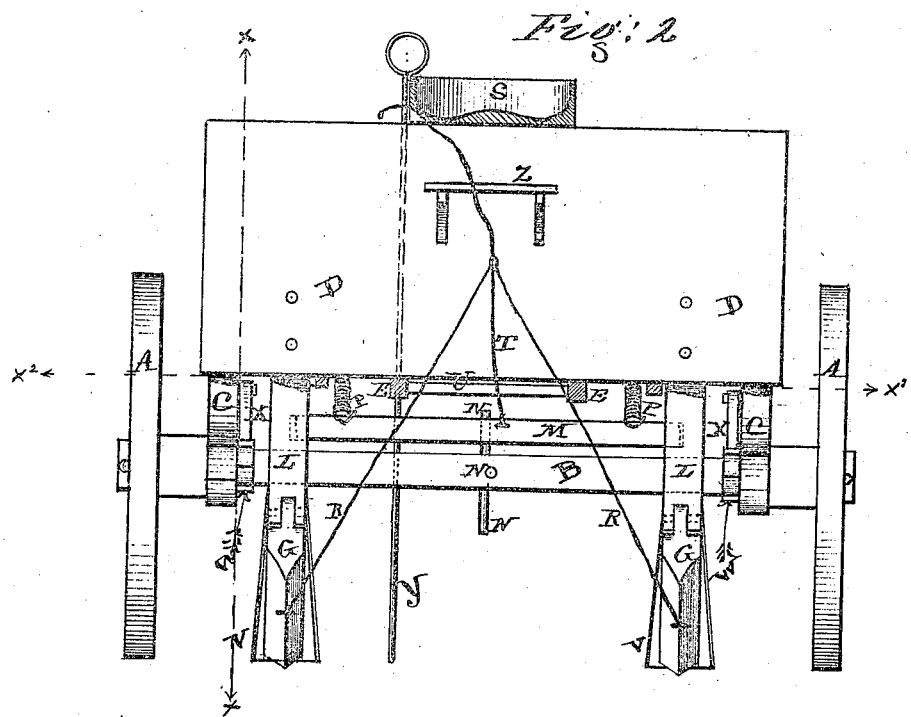

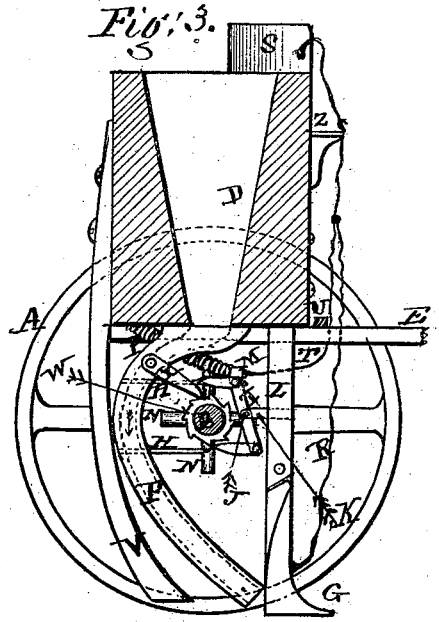
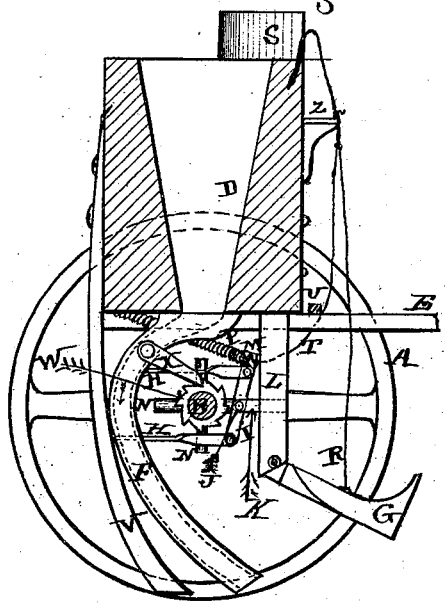
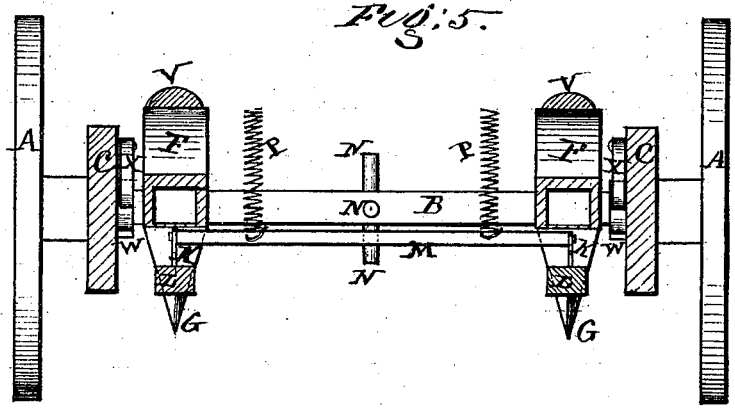

United States Patent Office.

WILLIAM F. WEST, OF HAVERSTRAW, NEW YORK.

Letters Patent No. 110,706, dated January 3, 1871.

IMPROVEMENT IN SEED-PLANTERS.

The Schedule referred to in these Letters Patent and making part of the same.

*To all whom it may concern:*

Be it known that I, WILLIAM F. WEST, of Haverstraw, Rockland county, and State of New York, have invented certain new and useful Improvements in Seed-Planters; and I do hereby declare that the following is a full description of the same.

The nature of my invention consists in arranging and combining, with a sulky or two-wheel cart, one or more seed-boxes or hoppers, having trunks leading therefrom for the discharge of the seed, and alternating slide valves therein operated by means of double-acting levers secured to a spring-bar arranged above and parallel with the axle of the machine, and operated as it rotates forward by cams projecting from the sides of the said axle.

Also, in combining, with the said seed-hoppers and trunks, an adjustable plow and seed-coverer.

Also, in combining, with the adjustable plow and valves for dropping the seed, a double-acting pulley-cord, chain, or rod, whereby the machine may be thrown out of use, at the discretion of the operator, to overcome obstructions in the track of the cart.

Also, in combining, with the said adjustable plows and hoppers and seeding-trunks, an adjustable guide-rod or track-marker, so as to guide the operator in making regular rows of droppings of seed.

But to describe my invention more particularly, I will refer to the accompanying drawing forming a part of this specification, the same letters of reference wherever they occur referring to like parts.

*Sheet 1.*

Figure 1 is a plan view of the machine.
Figure 2 is a front view of the machine.

*Sheet 2.*

Figure 3 is an end view of the machine through the line $x\, x$, fig. 2, sheet 1.

Figure 4 is an end view through the line $x\, x$, fig. 2, sheet 1, showing the plow elevated, or thrown out of use, and the hopper-valves thrown out of gear with the cams on the axis of the cart.

Figure 5 is a plan view of the planter through the line $x^2\, x^2$, fig. 2, sheet 1.

Letter A represents the wheels of the cart, keyed or otherwise secured solidly to an axle, B, so as to cause it to rotate with the wheels.

Upon this axle is secured, by suitable bearings, C, the seed-boxes or hoppers D, which are prevented from capsizing either backward or forward by means of the thills E attached to its under or lower side, and in which the horse is secured to propel the machine.

To the lower side of the seed-boxes or hoppers are secured trunks, F, which project downward and forward, so as to follow in a furrow made by the plow G, and deposit the seed therein.

To do this at regular and proper times, two valves, H, (one above the other, a few inches apart,) are inserted crosswise of the trunks, and secured at their outer ends to a vibrating lever, I, having its center-pin, J, in the end of a stationary stud, K, projecting from the back edge or side of the plow-holder L.

By this arrangement of the valves they are alternately operated for dropping the seed by means of a bar or rod, M, secured to the upper ends of the vibrating levers I and pins or cams N upon the axle B.

Thus, as the wheels and axle rotate, the cams, in succession, come against the bar M, which draws back the upper valve in the hopper-trunk, and pushes in the lower valve therein, upon which the seed falls.

Instantly that the cams pass the bar the spiral springs P, attached to the bar and the back lower edge of the hopper, draw the bar back to close the upper valve, and open the lower one again to let the seed drop down the trunk into the furrow.

This furrow is made by a plow, G, secured upon a center-pin in the plow-beam or holder L. The object of this adjustment of the plow on a hinge or center-pin is to admit of its being elevated so as to overcome any obstructions to the progress of the machine over the ground.

For accomplishing this object a cord or chain, R, is secured to the lower front edge of the plows, and carried up between the thills to the driver's seat S, on top of the hopper-box, so as to be under the control of the driver, to lift the points of the plows at his discretion; also, connected with this cord R is another cord, T, having its lower end secured to the bar M, and which is intended to release or draw it back from the action of the cams on the axle B, and at the same time close the lower valve in the trunks, when suspending the operation of the machine for dropping seed, on passing over obstructions, or going to and from the field where the seed is to be sown.

For the purpose of giving a purchase or leverage to the cord T, to draw against the the bar M in a direct line, it is carried over the front edge of the cross-bar U in the thills. It will be obvious that a roller may be interposed for the cord to run on to save friction, and thus make its operation quite easy for the driver.

For the purpose of covering the seed when deposited in the furrow a scraper or hoe-like device, V, is secured to the back side of the trunks F, of such a shape and in such a position as to draw the soil over the seed to insure their germination.

To prevent the machine from dropping seed when backing, racks W are formed on the axle B, into which pawls X, secured to the bearings C, engage to lock the axle from rotating backward, and thus cause the wheels to slip on the ground and avoid dropping the seed.

Letter Y is a guide or furrowing-rod, arranged so as to be within easy reach of the driver of the cart, and extending down through the sides of the seed-boxes or hoppers to the ground. The object of this rod is to mark the points of departure, on striking a furrow across a field, and thus enable the driver to keep his rows of seed at uniform distances apart without the necessity of dismounting from his seat at the end of each furrow to assure himself of the fact that he is seeding down the field properly and economically.

Letter Z is a foot-rest for the driver, secured to the front of the seed-box.

Having now described my improved seed-planter, I will proceed to set forth what I claim and desire to secure by Letters Patent of the United States:

The combination and arrangement of the revolving axle B, pins N, bar M, lever I, and valves H, with the trunks F, track-coverer V, hinged plow G, and cords R and T, all made and operating substantially as described, and for the purposes hereinbefore set forth.

WILLIAM F. WEST.

Witnesses:
 CHARLES L. BARRITT,
 FRANKLIN BARRITT.